United States Patent [19]

Mikami et al.

[11] Patent Number: 4,479,407

[45] Date of Patent: Oct. 30, 1984

[54] METHOD AND APPARATUS FOR PROCESSING INSULATED WIRE

[75] Inventors: Hitoshi Mikami, Susono; Noboru Ito, Kakegawa, both of Japan

[73] Assignee: Yazaki Corporation, Tokyo, Japan

[21] Appl. No.: 268,183

[22] Filed: May 29, 1981

[30] Foreign Application Priority Data

May 30, 1980 [JP] Japan ................................. 55-71460
May 30, 1980 [JP] Japan ................................. 55-71461
May 30, 1980 [JP] Japan ................................. 55-71462
May 30, 1980 [JP] Japan ................................. 55-71463

[51] Int. Cl.³ .......................... H01R 43/04; H02G 1/12
[52] U.S. Cl. ................................... 81/9.51; 29/33 M; 29/564.4; 29/753
[58] Field of Search ............... 29/33 M, 564.4, 564.3, 29/753, 564.1, 564.2, 33 F; 81/9.51

[56] References Cited

U.S. PATENT DOCUMENTS 3,918,330 11/1975 Blaha .................................. 81/9.51
3,964,142 6/1976 Ogawa et al. ...................... 29/33 M
4,275,619 6/1981 Shimizu ............................. 81/9.51

Primary Examiner—Z. R. Bilinsky

[57] ABSTRACT

A method and apparatus for processing an insulated wire. A long continuous wire coated with insulation covering is paid out intermittently, fed by a predetermined amount, clamped and cut into short wires with their opposite ends are stripped automatically. The method is performed by a device comprising a wire measuring section including a pair of measuring rollers to hold the wire and pay it out intermittently by a predetermined amount, a wire feeding section having a pinch rollers to feed the paid-out wire similarly by a predetermined amount, a wire cutting section having a wire cutter and a pair of insulator cutters, and a wire holding and transferring section to transfer cut-off short wires for final treatment.

7 Claims, 14 Drawing Figures

METHOD AND APPARATUS FOR PROCESSING INSULATED WIRE

BACKGROUND OF THE INVENTION

The present invention relates to a method and apparatus for processing a wire to produce wires necessary for wiring work by measuring and feeding, by a predetermined amount, a long insulated wire, cutting and stripping (removal of the insulative covering) the wire, transferring a cut-off short wire in a direction perpendicular to the wire feed direction, and attaching an electric connector to the cut wire.

We have proposed in Japanese Patent Application No. 54-52051 a wire processing apparatus which includes a device for supplying and paying out a wire by a predetermined amount, a device for gripping a leading end portion of the fed wire and turning it into a hairpin shape, a device for cutting the supplied and measured wire to form a trailing end thereof, and a device for gripping opposite end portions of the cut-off wire and transferring it in a direction perpendicular to the wire paying-out direction.

This type of wire processing apparatus is suitable for relatively long wires such as those longer than 1 m but not for relatively short wires such as those of a length within the range of 10–100 cm. Additionally, this apparatus is designed to process relatively long wires and, therefore, it cannot avoid a bulky construction while failing to produce accurately measured short wires with ease.

SUMMARY OF THE INVENTION

It is therefore an object of the present invention to improve the wire paying-out, feeding and insulation-removing systems so that relatively short wires can be cut-off with accuracy and at a high rate while the apparatus can have its overall size reduced.

A wire processing method according to the present invention comprises the steps of paying out a long continuous wire coated with insulation covering by a predetermined amount for measuring purposes; feeding the paid-out wire by said predetermined amount in a straight line in a predetermined direction; clamping said fed wire at first and second positions; cutting the clamped wire at a cutting position between said first and second positions to cut off a short wire; cutting into the insulation covering of the wires with a pair of insulator cutters on both sides of the cutting position between the first and second positions; removing the insulation covering between the insulator cutters by pulling the cut off the wires away from the cutting position; and transferring the short wire in a direction perpendicular to the predetermined direction.

A wire processing apparatus according to the present invention comprises a wire measuring section including a pair of measuring rollers adapted to hold therebetween a long continuous wire coated with insulation covering and pay out said wire intermittently by a predetermined amount; a wire feeding section including a pair of pinch rollers adapted to feed the paid-out wire intermittently by said predetermined amount in a predetermined direction and first wires clamp means for clamping the fed wire and adapted for movement in said predetermined direction; a wire cutting section including a cutter to cut the fed wire at a cutting position to cut off a short wire and a pair of insulation cutters to cut into the insulation covering on both sides of the cutting position; and a wire holding and transferring section including second wire clamp means for clamping the fed wire and transferring the cut-off short wire in a direction perpendicular to said predetermined direction, said first and second clamp means being, prior to said transferring, adapted to move the cut-off wires away from said cutting position while the insulator cutters in a cutting-in state to remove the insulation covering between the insulator cutters.

BRIEF DESCRIPTION OF THE DRAWINGS

Drawings illustrate one embodiment of the present invention, in which.

DETAILED DESCRIPTION OF THE EMBODIMENTS

Figure 1:
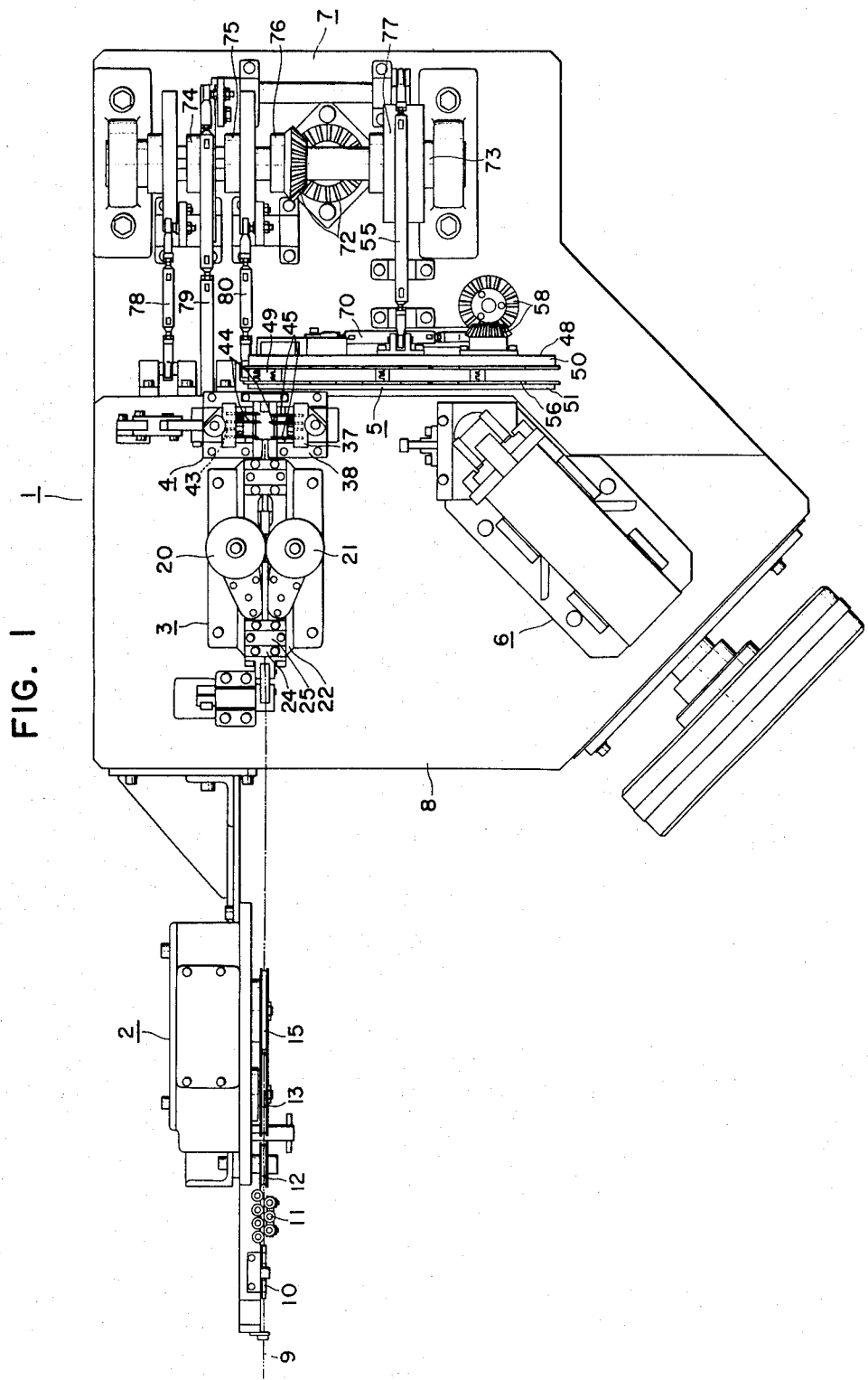
FIG. 1 is a plan view of the entire arrangement of a wire processing apparatus embodying the present invention.

The wire processing apparatus is illustrated in plan in FIG. 1. As shown, the wire processing apparatus generally comprises a wire measuring section 2, a wire feeding section 3, a wire cutting section 4, a wire holding and transferring section 5 and a section 6 for pressing electrical connectors onto the wires. The wire feeding section 3 bifunctions as a covering remover in cooperation with the wire holding and transferring section as will be described. The sections 2–4 are arranged on a frame 8 of the apparatus one after another along a predetermined wire feed path whereas the sections 5 and 6 are arranged in substantially perpendicular relation to the wire feed path. The apparatus also comprises a section 7 for controlling the actions of the individual sections 3–5.

A long continuous wire 9 coated with insulation covering is supplied from a reel (not shown) and passed through two sets of straightening rollers or strainers 10 and 11 which act on the wire 9 in two planes perpendicular to each other, respectively. The wire 9 coming out of the strainers 11 is guided by a guide roller 12 onto a plain roller 13 which then passes it to pair of opposite measuring rollers 14 and 15. Said measuring rollers hold the wire therebetween and pay it out intermittently by a predetermined amount. Once slackened into a hairpin shape, the wire 9 is further sent out by the feeding section 3 to the cutting section 4 and the holding and transferring section 5.

Figure 2:
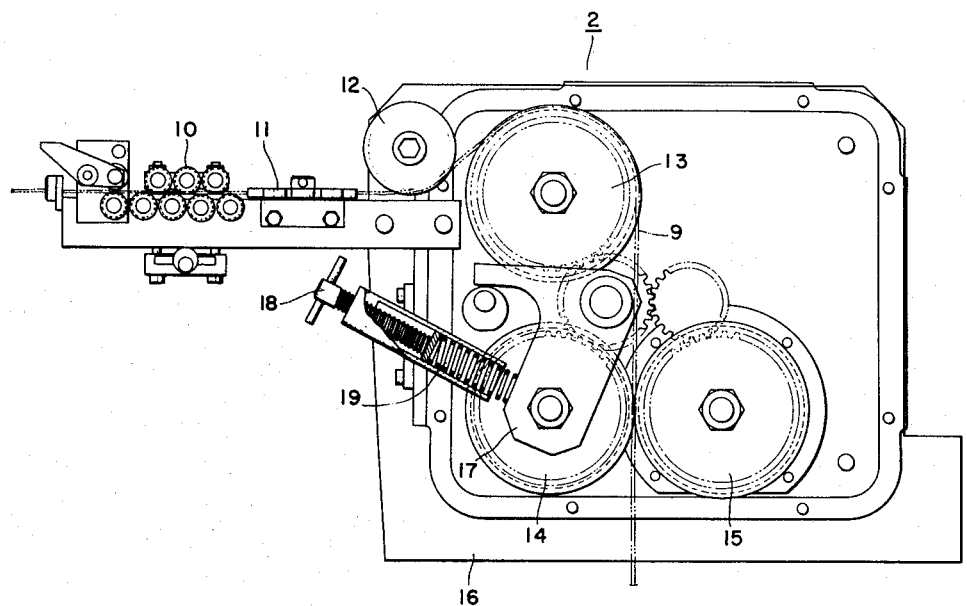
FIG. 2 is an enlarged front view of a wire measuring section.

As viewed in FIG. 2, the measuring rollers 14 and 15 are located below and downstream of the plain roller 13 in such a manner as to move the wire 9 vertically downward out therefrom. The measuring rollers 14 and 15 are knurled at the outer peripheries for the purpose of slip prevention. A bellcrank lever (no numeral) is journalled to a flat roller mount 16 and pivotally carries one 14 of the measuring rollers at its one arm 17. This arm 17 of the bellcrank lever is constantly biased by a spring 19 toward the other measuring roller 15 so that the roller 14 presses the wire 9 in coaction with the roller 15. This pressing force is controllable through an adjusting screw 18 which determines a spring force of the spring 19 on the bellcrank arm 17. The rollers 13, 14 and 15 are driven in synchronism by an electric print motor (not shown) via a gearing. The motor is furnished with an encoder to promote accurate measurement of the wire 9.

The wire feeding section 3 includes a pair of pinch rollers 20 and 21 adapted to send out the wire 9 in a predetermined direction intermittently by said predetermined amount and a clamp slider 22 which is reciprocatable in the predetermined wire feed direction.

Figure 3:
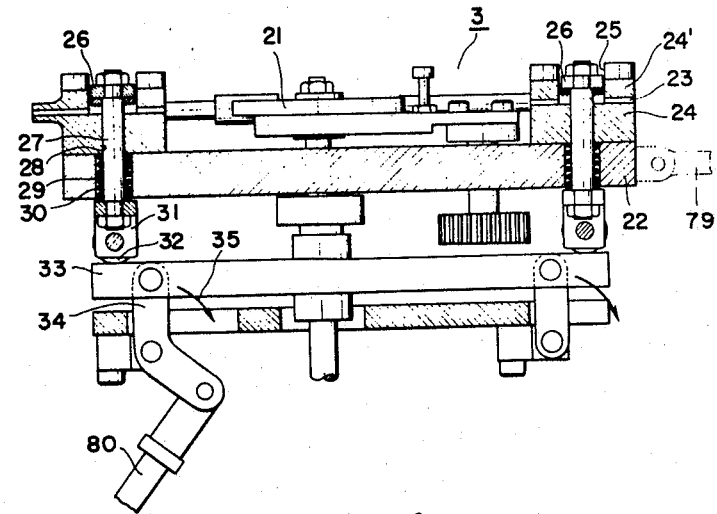
FIG. 3 is a fragmentary vertically sectioned side elevation of a wire feeding section.
Figure 4:
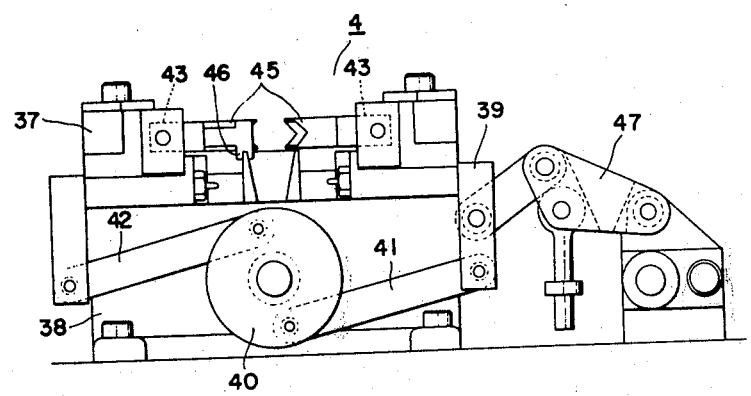
FIG. 4 is an enlarged front view of a wire cutting section.

As shown in FIG. 3, channel-shaped clamp bases 24 are securely mounted to the opposite ends of the clamp slider 22 with respect to the wire feed direction. Each clamp base 24 is formed with wire insertion bores 23 in its rising walls 24' to guide the paid-out wire in a straight line and a channel groove or a central recess 25 in which a wire clamp 26 is movable up and down. The wire clamp 26 is screwed onto a clamp pin 27 which extends downward from the recess 25 throughout a bore 28 formed in the clamp base 24 and a bore 29 formed in the clamp slider 22. A spring 30 is disposed around the clamp pin 27 within the bore 29 of the clamp slider 22. The lower ends of the respective clamp pins 27 are threaded into a frame 31 which carries idle rollers 32 rotatably therewith. The idle rollers 32 usually rest on a support member 33 as indicated in FIG. 3 maintaining the wire clamps 26 in their open positions relative to the corresponding clamp bases 24. A bellcrank lever 34 is pivotted to the support 33 as illustrated. When this lever 34 swings about its pivot axis in a direction indicated by an arrow 35, the support member 33 is lowered and the clamp pins 27 will be urged downward under the actions of the springs 27 to close the wire clamps 26 relative to the corresponding clamp bases 24 and thereby hold the wire 9 therebetween.

As will be stated later, a third cam 76 and a second cam 75 are installed in the action control section 7 so as to control the opening and closing actions of the wire clamps 26 and the reciprocation of the clamp slider 22, respectively.

The cutting section 4 includes a pair of cutter holders 37 which slide toward and away from each other in a direction perpendicular to the predetermined wire feed direction, and a cutter head 38 which supports and guides the cutter holders 37. The cutter holders 37 have shoulder portions 39 from which arms 41 and 42 extend to diametrically opposite points on a disc cam 40 which is journalled to a laterally intermediate area of a lower portion of the cutter head 38. The arms 41 and 42 are individually pivotted to said points on the disc cam 40 so that they move the associated cutter holders 37 toward each other upon clockwise rotation of the disc cam 40. Each cutter holder 37 is formed with a plurality of parallel grooves 43 which are laterally aligned with those of the other cutter holder 37. A wire cutter 44 is securely mounted in one of the grooves 43 in one cutter holder 37 to coact with a wire cutter 44 in the aligned groove 43 in the other. Two insulator cutters 45 are held in those grooves 43 on each cutter holder 37 which are located at the opposite sides and suitably spaced from the corresponding groove 43 adapted to hold the wire cutter 44, the insulator cutters 45 thus being aligned with those on the other cutter holder 37. A chip drop 46 protrudes from the lower end of each insulator cutter 45. A first cam 74 included in the action control section 7 is operatively connected with a link mechanism which includes a toggle crank 47 which is pivotted to the shoulder portion 39 of one of the cutter holders 37. The first cam 74 serves to control the cutting and incising actions of the cutters 44, 45.

The wire holding and transferring section 5 includes a swingable plate 48 which extends perpendicular to the wire feed direction and is swingable forward with respect to the wire feed direction. A plurality of chain clamps 49 are mounted to the swingable plate 48 as will be described.

Figure 5:
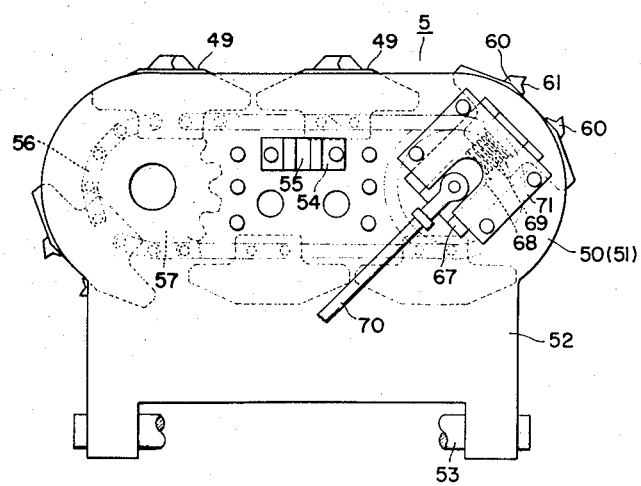
FIG. 5 is an enlarged front view of a wire holding and transferring section.

The swingable plate 48 has an oval front panel 50 and an oval rear panel 51 which face each other at a predetermined spacing in an upper portion of the plate 48. As seen in FIG. 5, a lower or base end 52 of the swingable plate 48 is rotatably mounted on a support bar 53 while one end of an actuating link 55 is pivoted to a mounting block 54 which is rigid on an upper, intermediate portion of the front panel 50. With this arrangement, the swingable plate 48 will tilt a predetermined angular distance forwardly in accordance with a telescopic action of the actuating link 55. The actuating link 55 is controlled by a second cam 75 further included in the action control section 7 as will be described.

The chain clamps 49 are secured at given intervals to an endless chain 56 which is passed around two sprockets 57 which are in turn journalled to the inner walls of the swingable plate 48. One of the sprockets 57 is driven for rotation by a motor (not shown) through intermeshed bevel gears 58 whereby the spaced chain clamps 49 are indexed together by each predetermined distance on the chain 56.

Figure 6:
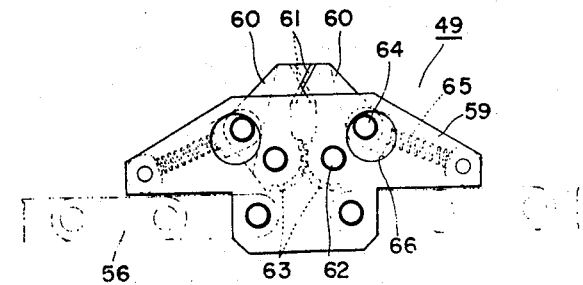
FIG. 6 is an enlarged front view of a chain clamp in the wire holding and transferring section.
Figure 7A:
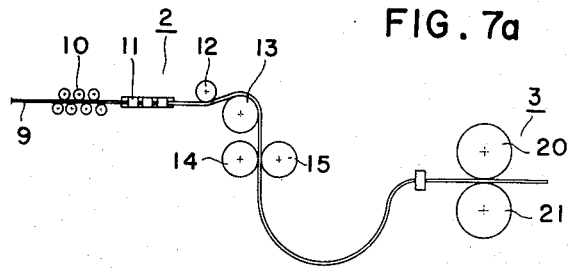
FIGS. 7a to 7h show a series of wire processing steps.
Figure 7B:
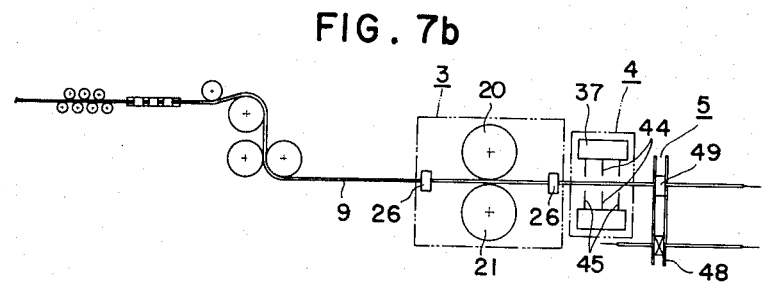
Figure 7C:
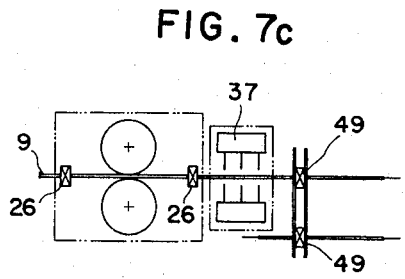
Figure 7F:
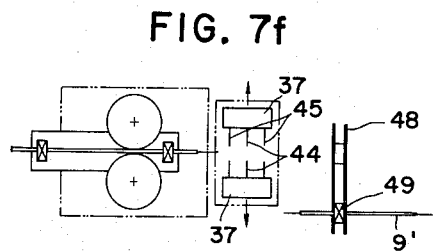
Figure 7D:
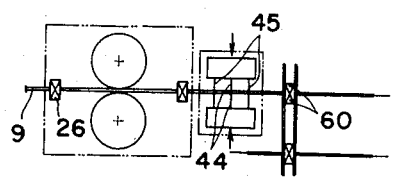
Figure 7G:
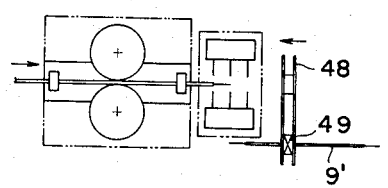
Figure 7E:
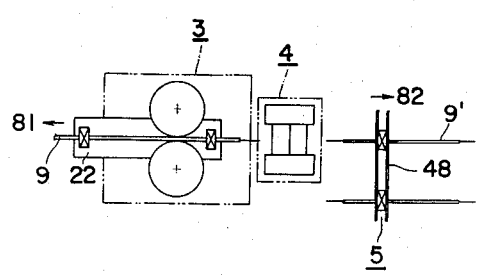
Figure 7H:
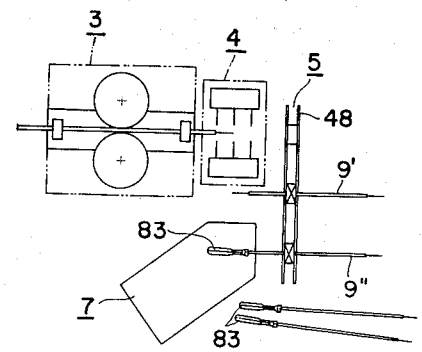

As shown in detail in FIG. 6, each chain clamp 49 comprises a pair of opposite pawl holders 59 fixed to the chain 56 and a pair of clamping pawls 60. Each of the paired clamping pawls 60 is generally V-shaped and formed with a projection or a recess 61 in its upper end portion which faces a recess or a projection 61 of the other clamping pawl 60 so as to selectively retain the wire 9 therebetween. The base ends of the clamping pawls 60 are toothed as at 63 along their outer peripheral edges and held in constant mesh with each other. A knock pin 64 is rotatably attached to the intermediate bent of each V-shaped clamping pawl 60 and projects from an opening 66 which is formed through the front pawl holder 59. A coiled compression spring 65 is anchored at one end to the knock pin 64 on each pawl 60 and at the other end to the adjacent ends of the pawl holders 59, normally urging the corresponding clamping pawl 60 to a closed position where it will coact with the other clamping pawl 60.

The section 5 is provided with means for intensifying the clamping force of the pawls 60 by resiliently pressing the knock pins 64 on the pawls 60. A presser plate 67 is slidably mounted on a guide 71 which is rigidly mounted to the front panel 50 of the swingable plate 48. The pressure plate 67 has a chamber 68 in its upper portion which accommodates a coiled compression spring 69. One end of an actuating link 70 is coupled in a lower portion of the pressure plate 67 to be movable inward toward the spring chamber 68. When the actuating link 70 moves upward deeper into the presser plate 67, it will cause the upper end of the presser plate 67 into pressing contact with the knock pins 64 thereby increasing the intensity of a clamping force imparted from the clamping pawls 60 to the wire 9. It is noteworthy here that the compression spring 69 in the chamber 68 absorbs any excessive force exerted by the link 70 by virtue of its repulsion and thereby permits the pawls 60 to clamp a wire 9 positively with an increased yet optimum intensity whatever the diameter of the wire may be. The link 70 is controlled by a fourth cam 77 included in the action control section 7, such that said increase of clamping force is provided at the time of the tilting action of the swingable plate 48.

Concerning the connector pressing section 6, it can be afforded by an ordinary device of a compact design and, therefore, detailed description thereof will be omitted herein.

In the action control section 7, the first cam 74, second cam 75, third cam 76 and fouth cam 77 are individually mounted on a common shaft 73 which is connected with a drive source through bevel gears 72.

The cams 74–77 are formed with cam grooves of different phases which conform to predetermined operating time periods of the devices 3–5 described, respectively. The first cam 74 is operatively connected with the toggle crank 47 of the cutting section 4 by a first link 78. The second cam 75 is operatively connected with the clamp slider 22 of the wire feeding device 3 by a second link 79 and with the mounting block 54 on the swingable plate 48 by a third link 55. The third cam 76 is connected with the bellcrank lever 34 of the wire feeding device 3 by a fourth link 80. The fourth cam 77 is connected with the pressure plate 67 by a fifth link 70.

Referring to FIGS. 7(a)–7(h), there will be described operation of the apparatus thus constructed together with effects achievable therewith.

(1) Measurement and Detantion of Wire (FIG. 7[a])

A wire 9 paid-out from a reel is straightened by the strainers 10 and 11 and then measured by the measuring rollers 14, 15. The wire 9 is fed, by a predetermined amount, vertically downward by the rollers 14, 15 and detained in the form of a hairpin between the rollers 14, 15 and the wire feeding section 3.

The measuring section 3 according to the present invention has various advantages over a conventional measuring device: (1) that a minimum number of rollers are used which simplifies the construction and arrangement, (2) that the diameter of the wire 9 does not affect a measured result of the wire because the wire 9 is not wound on any of the measuring rollers, e.g. roller 14, (3) that the measurement is free from influence of inertia of the rollers 14, 15 making slippage at a start and a stop negligible because the wire 9 is pressed between a pair of knurled rollers 14, 15 and taken into and out therefrom in accordance with the rotation of the rollers and because the drive motor for the rollers 14, 15 is integral with an encoder for measurement, (4) that the vertically downward feed of the wire 9 from the rollers 14, 15 minimizes a space required for the detention of the wire thereby reducing the distance between the measuring section 2 and feeding section 3 with the resultant decrease in the overall size of the apparatus, etc.

(2) Wire Feed by Pinch Rollers (FIG. 7[b])

The measured, hairpin-shaped part of the wire 9 is sent out by the pinch rollers 20, 21 of the wire feeding section 3 to the cutting section 4 and then to the wire holder and transferring section 5.

In the course of this operating step, the wire clamps 26 of the section 3, the cutter head 37 of the section 4 and a particular chain clamp 49 located at the rightmost side of the swingable plate 48 of the device 5 are all kept in their open positions. (3) Wire Clamping (FIG. 7[c])

When the measured length of wire 9 is fed out by the pinch rollers 20, 21, the wire clamps 26 and the rightmost chain clamp 49 are closed to retain the wire 9 at the opposite sides of the cutter head 38 with respect to the wire feed direction. Essentially, it is enough that only the right wire clamp 26 clamps the wire at a first position and the chain clamp 29 at a second position.

More specifically, the third and fourth cams 76 and 77 are rotated to displace the clamping link 80 and clamp-intersifying link, respectively. As a result, a part of the wire 9 passed through the wire insertion opening 23 of each clamp base 24 is retained between the clamp base 24 and the corresponding wire clamp 26 now lowered. Another part of the wire 9 intervening between clamp pawls 60 paired together is first retained by the action of the compression springs 65 and then clamped more tightly by the actions of the compression spring 69 and presser plate 67. In this way, the wire clamps 26 and clamp pawls 60 commonly retain the wire 9 resiliently through springs and, therefore, they can fix the wire in place without damaging the insulating coat which covers the wire 9.

(4) Cutting and Incising Wire (FIG. 7[d])

While the wire 9 is being tightly held by the wire clamps 26 and clamp pawls 60 at the opposite sides of the cutter head 37, the cutting and incising device 4 is activated to cut the measured length of the wire from the remainder and form cuts in the insulating coat which is necessary to remove the coat through predetermined lengths in the subsequent step.

More specifically, the first cam 74 is rotated to displace the cutting and incising link 78 and thereby rotate the toggle crank 47. This causes the wire cutter pair 44 and the insulator cutter pairs 45 to move toward the wire 9 perpendicularly to and from both sides of the wire, thus cutting and incising the wire 9.

(5) Removal of Covering (FIG. 7[e])

After the cutting and incising step, the clamp slider 22 and swingable plate 48 are moved away from each other as indicated by arrows 81 and 82, respectively, so as to partly strip the wire.

For this operation, while the insulator cutter pairs 45 are remaining cut into the insulation covering of the wire 9, the second cam 75 is rotated to displace the associated sliding link 79 and swinging link 55. The link 79 then moves the clamp slider 22 as indicated by an arrow 81 while the link 55 tilts the swingable plate 48 through a predetermined angle as indicated by an arrow 82 about the support bar 53 on which it is mounted. As a result, the wire 9 and the wire 9' cut from the wire 9 are stripped at their ends.

(6) Wire Transfer and Cutter Retraction (FIG. 7[f])

After the removal of the insulation covering, the first cam 74 is rotated to move the cutter holders 37 backward through the aforementioned mechanism whereby the cutters 44, 45 are brought back to the open positions.

At the same time, with the swingable plate 48 kept tilted, the sprocket 57 driven by the intermeshed bevel gears 58 drives the chain 56 in a predetermined direction so that the chain clamp 49 retaining the cut wire 9' is shifted one preset pitch to the center of the swingable plate 48.

(7) Return of Clamp Slider 22 and Swingable Plate (FIG.7[g])

In the course of the step (6), the clamp slider 22 and swingable plate 48 are returned to the positions adjacent to the cutting section 4 and discussed in the step (2) so as to prepare for the delivery of another predetermined length of wire. The wire clamps 26 will then have been opened and a second chain clamp 49 will have been brought into registry with the wire feed path in its open position. These actions are generated by the mechanisms already described and, therefore, will not be explained any further. (8) Attachment of Connector (FIG. 7[h])

The cut and partly stripped wire 9″ is carried during the step (6) to a position adjacent to the leftmost end of the swingable plate 48. The connector pressing device 7 is then activated to press an electric connector 83 fixedly onto the stripped end of the wire 9″. This operation occurs during the interval between the step (2) wherein the pinch rollers 20, 21 of the device 3 feeds a predetermined length of wire and the step (5) wherein the second cam 75 is rotated to strip the wire.

The successive steps (1)–(8) described above will be repeated thereafter to measure the wire, feed the wire, cut and incise the wire, transfer the cut wire and attach a connector to the cut wire in a continuous fashion. All these actions are generated by one rotation of the shaft 73. With the arrangement shown and described, a processing rate as high as 6000 wires per hour is achievable for wire lengths up to 600 mm and supposing that the shaft completes one rotation in 0.6 second.

According to the present invention, a wire measurement and feed procedure is divided into a first step of measuring a wire while pulling it, feeding it and detaining the measured length of the wire in a slackened hairpin shape, and a second step of sending out the detained length of the wire; a device for so sending out the wire cooperates with a holding and transferring section to remove the insulator on the wire. It will thus be seen that the present invention promotes accurate and quick processing of even short wires and a decrease in the overall size of the apparatus.

What is claimed is:

1. A method of processing an insulated wire comprising the steps of
   (a) playing out a long continuous wire coated with insulation covering by a predetermined amount for measuring purposes;
   (b) feeding the played out wire by said predetermined amount in a straight line in a first direction;
   (c) clamping said fed wire at first and second positions;
   (d) cutting the clamped wire at a cutting position between said first and second positions to cut off a short wire;
   (e) cutting into the insulation covering of the wires with a pair of insulator cutters on both sides of the cutting position between the first and second positions;
   (f) removing the insulation covering between the insulator cutters by pulling the clamped wires away from each other;
   (g) trasnferring the clamped short wires in a second direction perpendicular to the first direction; and
   (h) repeating the steps (a) to (g) to feed a plurality of short wires along said second direction for wire end processing, said pulling in step (f) including swinging said plurality of short wires about an axis extending parallel to said second direction.

2. A method of processing an insulated wire according to claim 1, wherein force of said clamping performed at the second position is increased at the time of said swinging action.

3. A method of processing an insulated wire according to claim 1, wherein said transferring step includes a step of transferring the short wire intermittently.

4. An apparatus for processing an insulated wire comprising:
   (a) a wire measuring section including a pair of measuring rollers adapted to hold therebetween a long continuous wire coated with insulation covering and play out said wire intermittently by a predetermined amount;
   (b) a wire feeding section including a pair of pinch rollers adapted to feed the played out wire intermittently by said predetermined amount in a first direction and first wire clamp means for clamping the fed wire, a clamp slider provided along the first direction and adapted for reciprocating therealong;
   (c) a wire cutting section including a cutter to cut the fed wire at a cutting position to cut off a short wire and a pair of insulation cutters to cut into the insulation covering on both sides of the cutting position; and
   (d) a wire holding and transferring section including second wire clamp means for clamping the fed wire and transferring the cut-off short wire in a second direction perpendicular to said first direction, said first and second clamp means being, prior to said transferring, adapted to move away from each other while maintaining the clamp of the wires and the insulator cutters in a cutting-ih state to remove the insulation covering between the insulator cutters, means provided to swing said wire holding and transferring section about an axis extending parallel to said second direction such that said movement of the second clamp means is performed in a swinging motion.

5. An apparatus for processing an insulated wire according to claim 4, wherein said wire holding and transferring section including a swingable plate adapted to tilt a predetermined angular distance about said axis; and an endless chain supported by said swingable plate and adapted for an intermittent movement perpendicularly to said second direction, said second wire clamp means including a plurality of chain clamps provided on said endless chain at an interval corresponding to said intermittent movement.

6. An apparatus for processing an insulated wire according to claim 5, wherein each chain clamp includes a pair of clamping pawls adapted to take open and closed positions.

7. An apparatus for processing an insulated wire according to claim 5, wherein said pair of clamping pawls is adapted to increase a clamping force at its closed position.

* * * * *